Sept. 11, 1934.   P. J. BIRKMEYER   1,973,041
DRAG CONVEYER AND BELT
Filed Aug. 27, 1932
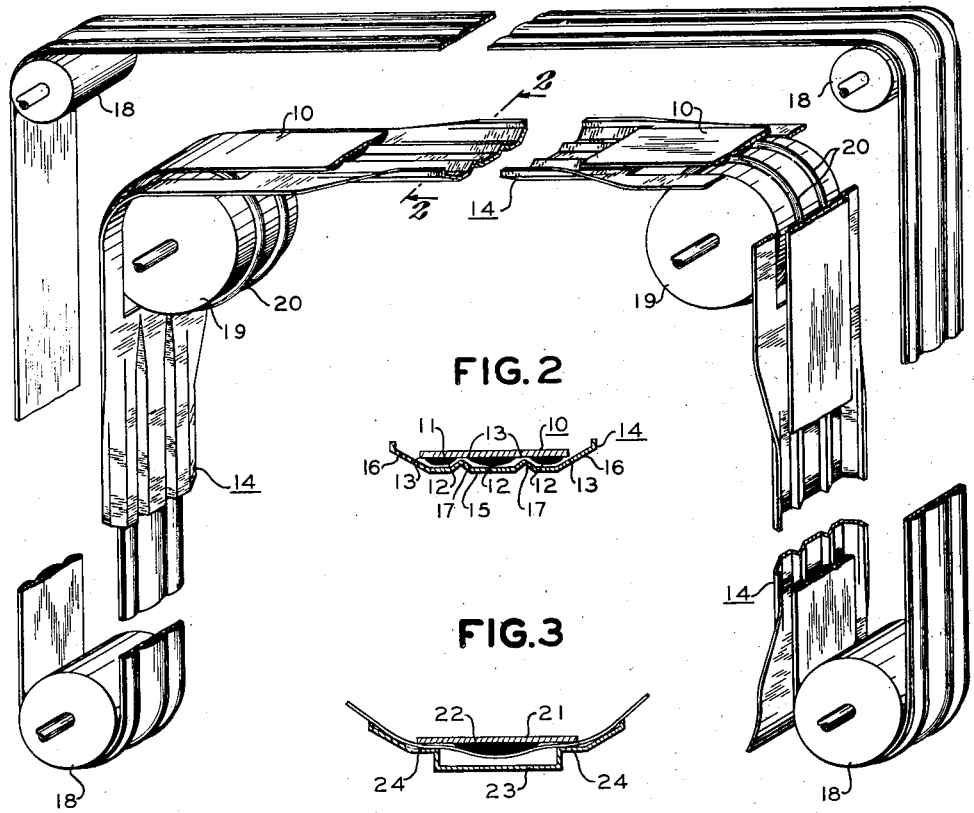
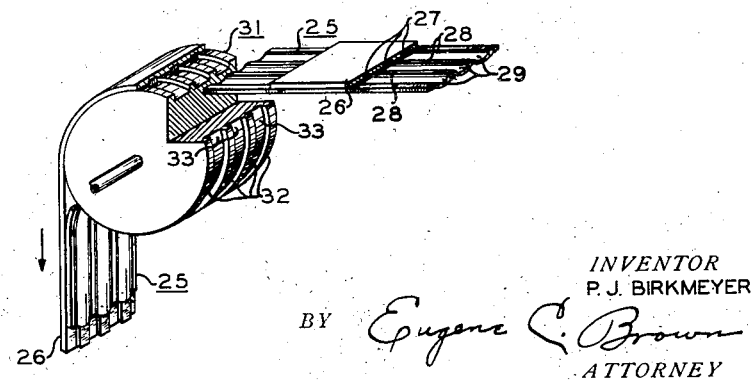
INVENTOR
P. J. BIRKMEYER
BY Eugene C. Brown
ATTORNEY Patented Sept. 11, 1934

1,973,041

UNITED STATES PATENT OFFICE 1,973,041

DRAG CONVEYER AND BELT

Paul J. Birkmeyer, Brooklyn, N. Y., assignor to
The Western Union Telegraph Company, New
York, N. Y., a corporation of New York Application August 27, 1932, Serial No. 630,735

11 Claims. (Cl. 198—160)

This invention relates to belt conveyers of the drag type and patricularly to belts for this type of conveyer.

An object of this invention is to provide a conveyer belt for drag type conveyers having a face, one portion of which has a high coefficient of friction and another portion of which has a relatively low coefficient of friction.

Another object of this invention is to provide a support for cooperating with a conveyer belt which has a face embodying longitudinally extending areas having a relatively high coefficient of friction with respect to the material to be conveyed and bordered by other areas having a relatively low coefficient of friction with respect to the support, the support having raised portions arranged to engage the portions of the face of the belt having a low coefficient of friction.

A further object of this invention is to provide a conveyer embodying a belt, the body of which is composed of a material best suited for tensile strength and a minimum resistance as it travels along a cooperating support, and a material, having a relatively high coefficient of friction with respect to the material to be conveyed, secured to the conveyer surface of the belt in longitudinally extending strips and spaced thereon so as to expose longitudinally extending portions of the body of the belt.

Another object is to provide a cooperating conveyer support with portions raised thereon to engage the exposed areas of the belt and provided with recesses which have sufficient clearance to permit the longitudinally extending belt strips to ride free of engagement with the trough as the belt travels therealong.

These and other objects will be apparent from the following description and claims taken in connection with the accompanying drawing forming a part thereof in which:

Fig. 1 is a diagrammatic illustration of a typical conveyer in its simplest form embodying this invention.

Fig. 2 is a cross-section of a conveyer belt and trough taken along the line 2—2 of Fig. 1.

Fig. 3 is a cross-section of a modified form of conveyer belt and trough; and

Fig. 4 is a diagrammatic illustration of a fragmentary portion showing another form of this invention.

Drag conveyers of the type involving a support member usually of a trough shape having a bottom and outwardly extending side portions along which a belt travels in frictional engagement therewith are now being quite extensively employed for conveying sheet material, particularly, sheets employed for telegrams, messages and the like. In this type of conveyer the material is dragged along the support, ordinarily a pressed sheet metal member, by the belt due to the fact that the coefficient of friction between the belt and the sheets of material is greater than that between the support and the material. In this arrangement, the material can be conveyed over considerable distances and in various directions either horizontally or vertically at relatively high speeds. In such an arrangement, message carriers such as employed in pneumatic tubes are not necessary. The sheets of material travel openly along the conveyer support between the support and the belt.

Some difficulty has been experienced, however, in this type of conveyer with regard to the sheets of material stopping along the conveyer channel. When the sheet material to be conveyed consists of telegraph blanks difficulty frequently results from glue from the telegram blank sticking to the channel. Messages of this type employing glue comprise a message blank to which the message in the form of a tape on which the printing occurs is glued. In applying the tape to the blank glue on the tape is moistened and sections of the tape arranged on the blank and pressed down. Sometimes in the gluing process a slight amount of moisture which has absorbed glue is deposited on the blank along the edges of the tape. In conveying these blanks along the conveyer channels some of this soft glue is deposited on the channels causing the same to become sticky. This sometimes causes the messages to adhere to the sticky channels and allows the belt to slide over them.

Another cause for the sheets sticking to the channels may be due to dirt or grease particles deposited on the channel members from the belt as it slides over the same. These deposits increase the friction between the channels and the sheet until the friction of the channel becomes equal or greater than that of the belt which again causes the belting to slide over the blanks.

Another cause which sometimes delays the sheets is due to the accumulation of static charges on the sheets or blanks. This charge builds up until the blanks adhere to the channel until they are carried forward by a roughened portion of the conveyed surface of the belt or until a succeeding message blank engages the same carrying it along the channel.

In each of these instances when the difficulty became pronounced some method of clearing out the messages involving members attached to the belt such as described in Patent 1,793,953, granted to F. E. d'Humy, et al., on Feb. 24, 1931, was resorted to, or manual inspection of the conveyer was necessary to insure that no blanks were adhering to the channel.

According to this invention, however, a type of belt has been provided which prevents blanks adhering to the conveyer channels from any of the above causes or conditions. Obviously, in telegraph service where speed is essential, any arrangement overcoming the tendency for telegraph messages to adhere to the conveyer channels is very desirable. It has been found that belting with a rubber surface or a surface of relatively high rubber content provides a surface of high resistance to motion or sliding in contact with paper, in other words it has a high coefficient of friction with respect to paper. This coefficient of friction has been found to be many times the coefficient between paper and metal or other suitable material employed as a support for drag conveyers. The coefficient of the friction between rubber and paper is such an amount as to carry sheets such as telegram blanks over a support which is relatively rough or which has become somewhat sticky or dirty due to small amounts of glue adhering thereto.

However, when a belt having a rubber surface is employed in drag conveyers the friction between the belt and the support becomes quite considerable. This causes the rubber to heat up and wear off rapidly and even deposits itself on the conveyer support when traveling at relatively high speed. The power required is increased considerably also. The power required to overcome the friction of the belt with the support represents the major portion of the power utilized in driving a conveyer employing a belt such as fabric or leather which have low coefficients of friction with regard to the support. Therefore, it is impractical to utilize a conveyer belt having a rubber surface or surface of relatively high rubber content which travels along the conveyer support in frictional contact therewith.

According to this invention, however, a type of belt is provided which embodies longitudinally extending strips or areas of rubber or rubberized surface along the belt bordered by areas of the belt body which may be of material of relatively low coefficient of friction. A support member for the belt is employed which embodies ribs arranged to engage the body of the belt and carry the same so that the rubberized portions travel over the recesses intervening between the rib portions. In other words, an arrangement is provided in which a rubber or rubberized surface engages the sheets of material producing substantially the same effect as a simple rubber belt while the areas engaging the support are of material having relatively low coefficient of friction. For further description of this invention reference will be had to the accompanying drawing.

Referring to Figs. 1 and 2 of the drawing, the preferred form of the invention is illustrated. It comprises a belt 10 embodying a body portion 11 of low friction material, such as cotton webbing, extending the full width of the belt. Longitudinally extending strips 12 preferably of live rubber or material of high rubber content, are secured to the conveying face of the belt and are spaced apart transversely of the belt to leave longitudinal extending exposed portions 13 between the strips and at the outer sides thereof.

The belt is arranged to travel in a trough or support member 14 embodying a bottom 15 and outwardly flaring side members 16. A pair of upstanding ribs 17 rise from the bottom of the trough to engage the inner exposed belt body portions 13. The exposed portions of the outer edges of the belt engage the side members 16. The trough is arranged so that the raised portions, that is, the sides 16 and ribs 17, provide a clearance between the applied strips 12 and the bottom of the trough so that the strips ride entirely free of the trough as the belt travels therealong, preventing the high friction and the collection of the rubber on the trough which would result from the strips coming in contact therewith. The sides of the trough due to their inclined shape provide a lateral guide for the belt which tends to prevent the same from swaying or sliding sidewise and bringing the strips 12 into contact with the supporting portion of the trough.

Although rubber or rubber composition material is preferred for the strips 12, they may be composed of any material which has a relatively high coefficient of friction with respect to the material to be conveyed. Various types of rubber composition material may be applied to the face of the belt. It has been found that a rubber composition known commercially as crepe rubber has qualities which are very desirable for conveying certain types of sheet material. This type of rubber composition while it may not be adapted for universal use, will be found of particular advantage where its application is desirable. In most cases a very small thickness of the material deposited on the face of the belt is sufficient. The thickness of the material would be determined largely by the type of sheets to be conveyed and the necessity for pressing the sheets downwardly somewhat into the clearance spaces of the channel to cause the desired amount of engagement with the high frictional portion of the belt surface. The number of strips applied to the belt may be varied also.

The support or trough member in which the belt travels is usually a pressed steel or similar member embodying rib portions in the bottom to form the belt engaging ridges or runners. The engaging surface of the ribs is preferably narrow in order to minimize the friction between the belt and the trough and also between sheet material and the trough as it travels therealong.

This invention may be employed in a conveyer system such as illustrated in Fig. 1 in simplified form. In this arrangement the support member 14 is flattened out at the extreme end adjacent a belt roller 18. The flat section of the support may serve either as an inlet or discharge. When serving as an inlet the material may be inserted between the lip of the flat section and the moving belt and carried upward until it is engaged by the belt. The material then moves forward along the support 14, in a vertical direction in the illustration, until it arrives near the point of change of direction from vertical to horizontal. At this point a roller 19 is provided to rotate in engagement with the conveying surface of the belt. In advance of the roller the support member 14 is again flattened out and bent around the roller. This permits the sheets of material to flatten out in a transverse direction before assuming a curved shape in the longitudinal direction as they pass around the roller. For supporting the belt upon the face of the roller 19 a pair of ribs 20 are provided to engage the exposed portions 17 of the face of the belt. The area excluding ribs is recessed to provide clearance so that the strips 12 may ride free on the roller. If it is desired, however, since there is no drag or sliding action between the face of the belt and the roller, the face of the latter may be plain or may be crown-shaped as the ordinary pulley. This latter arrangement might be preferred for conveying some types of sheet material which would be wrinkled to some extent due to the fact that the rubber strips 12 would press the plane of the sheets into the recessed portions of the roller somewhat. However, in ordinary circumstances where the rubber strips 12 are relatively thin, no difficulty will be experienced in employing the type illustrated.

It will be observed that the support member is cut away adjacent the roller 19 so that the latter may engage the belt 10. The horizontal section of the conveyer may be extended any desired distance and provided with any suitable discharge or transfer arrangement. In the illustration the horizontal section connects with another vertical section extending downwardly to another direction changing roller 18. Although not included in the illustration a discharge arrangement similar to the inlet provided at the entrant end of the conveyer may be employed. The belt is returned to the inlet end of the conveyer over an additional pair of rollers 18. It will be observed that, since the rollers 18 engage the back plain surface of the belt, they are not provided with a special surface but may be ordinary crowned rollers.

In Fig. 3 a cross-sectional view of another form of this invention is illustrated. In this form a belt 21 has applied thereto a relatively wide strip 22 having high frictional qualities and arranged to extend longitudinally along the center of the belt. The belt 21 rides in a channel embodying a recessed portion 23 over which the strip 22 rides and shoulders 24 arranged to engage the lateral edges of the belt. The edges are free from the material 22 and present relatively small frictional contact with the support. The conveyer action of this embodiment is similar to that of Fig. 2 and might be preferred for conveying certain types of material particularly relatively heavy stiff sheets. Fig. 4 illustrates still another form of this invention in which a channel member 25 or support, without the outwardly extending side portions, is employed. This arrangement comprises a conveyer belt 26 having a plurality of strips of rubber or other material 27 applied to the lower face of the belt. The channel member 25 embodies a plurality of ridges 28 separated by grooves or recesses 29. The ridges 28 are suitably spaced apart to engage the body portion of the belt intervening between the strips 27 so that the belt is carried with the strips of rubber material out of engagement with the support. The belt is suitably guided along the support by the rollers at the respective ends of the channel sections and also by the centering effect of the messages riding between the belt and the support. A roller 31 is illustrated engaging the conveying surface of the belt 26. The roller 31 may be either a plane surface crown roller or it may embody ridges 32 and intervening recesses or grooves 33 which cooperate to form substantially the same type of belt engaging surface as provided by the channel member 25. Beyond the roller the channel member 25 is bent slightly away from the belt so as to provide a space for the front edge of the sheets to enter the channel section as they leave the roller 31. It will be observed that with this arrangement the sheets of material being conveyed are not held bent upward along the edges as is the case in connection with the foregoing embodiments. This arrangement is particularly advantageous for conveying relatively rigid sheets of material such as cardboard and envelopes, particularly when the envelopes are of fairly thick material. The ribs along the support or channel member 28 provide line engagement with the material being conveyed and form creases even though slight, still sufficient to prevent the material from working itself sideways out of the conveyer as it is being carried along the channel. The strips of rubber or other material 27 form elements of substantially high frictional contact with the material and thereby more effectively convey the material than would be accomplished with the ordinary plane surface belt. When the belt is traveling along the portion of the channel in which no material is present, the exposed portions of the belt which have a relatively small coefficient of friction ride upon the ribs 28 and carry the rubber strips 27 free of engagement with the support. As in the previous embodiments this prevents the soft material comprising the strips 27 from being worn away by engagement with the channel and also prevents the possibility of soft material from being accumulated on the channel.

From the foregoing description it will be seen that a drag conveyer arrangement has been provided in which a belt is employed having portions of the conveying surface of the belt which engages the material to be conveyed composed of a material having a relatively high coefficient of friction with the material and at the same time other portions of the belt surface composed of material having a relatively low coefficient of friction and which surface acts as the supporting or riding surface of the belt. It will also be observed that the conveyer channel provided for cooperating with this belt embodies ribs or raised portions in its surface for engaging the riding surface of the belt. At the same time the channel is recessed between its ribs or raised portions so that the conveying surface of the belt embodying the relatively high friction material is carried free by the channel or support member. Such an arrangement provides the maximum conveying action upon the material to be conveyed and at the same time the minimum frictional drag upon the conveyer support minimizing the amount of power required to drive the conveyer. It will further be observed that the materials employed for constructing the belt are not restricted to any particular form, but may be designed to suit the conditions under which they are to be utilized.

While this invention has been illustrated as employed in connection with simple forms of drag conveyers, it is to be understood that the structure may be employed to include double faced belts and other arrangements known to those skilled in the art.

While this invention has been shown in but three forms, it will be apparent to those skilled in the art that it is not so limited but is susceptible to various other changes and combinations than those therein set forth without departing from the spirit thereof and it is desired, therefore, that only such limitations shall be placed thereon as are imposed by the prior art or set forth in the appended claims.

What I claim is:

1. The combination of a belt for drag conveyers having a material engaging surface embodying longitudinally extending rubbery areas separated by intervening spaces and a support arranged to engage the belt along said intervening spaces.

2. The combination of a belt for drag conveyers having a body composed of a relatively low frictional material, a support for said belt embodying longitudinally extending spaced runners arranged to engage the belt along spaced lines, said belt embodying strips of rubbery material secured thereto in suitable position to travel in the space intervening between said runners.

3. A drag conveyer comprising a belt having a face embodying longitudinally extending strips of material having a surface of relatively high coefficient of friction bordered by areas having a surface of relatively low coefficient of friction and a support having a surface over which the belt travels, said surface being provided with longitudinally extending raised portions arranged to engage the areas of the belt having low coefficient of friction, thereby said belt travels on the support with a minimum friction.

4. A drag conveyer comprising a belt having a face embodying areas of relatively high coefficient of friction bordered by areas of relatively low coefficient of friction and a support member having longitudinally extending raised portions arranged to form runners underneath the low frictional areas of the belt, the area of said support between said raised portions being recessed so that the high frictional areas of the belt surface travel free of the support.

5. A drag conveyer for sheet material comprising a longitudinally extending support member embodying upwardly extending ribs arranged to make contact with the sheet material along a fractional portion of its surface, a conveyer belt arranged to travel along said support and convey the sheets between it and the support by frictional engagement with the sheets, said belt having a conveying surface embodying longitudinally extending strips of material of a high frictional coefficient, said strips being disposed on the surface of the belt so as to lie between the ribs of the support when the belt is in conveying position upon the support while at the same time engaging a portion of the sheets of material extending between the ribs of the support as they are carried therealong, the intervening areas between said strips comprising a material of relatively low coefficient of friction and arranged to ride along said ribs to provide the sliding surface of the belt.

6. The combination of a belt for drag conveyers having an engaging surface embodying an area of relatively high coefficient of friction arranged to extend longitudinally of the belt, said engaging surface being bordered by areas of relatively low coefficient of friction, and a longitudinally extending support for said belt comprising supporting areas suitably spaced to make contact with the belt along said border areas.

7. The combination of a belt for drag conveyers having an engaging surface comprising an area of relatively high coefficient of friction arranged to extend longitudinally of the belt, said engaging surface being bordered by areas of relatively low coefficient of friction, and a longitudinally extending support for said belt comprising supporting areas suitably spaced to make a contact with the belt along said border areas, said support embodying a recessed bottom portion to provide clearance between the support and the area of said belt having relatively high coefficient of friction.

8. The combination in a drag conveyer of a belt having a conveying surface comprising spaced longitudinally extending strips bordered by longitudinally extending recessed areas and a guide roller for said belt embodying ribs on its surface arranged to engage the recessed portions of the belt, said ribs being of such height as to hold the strips of the conveying surface of the belt out of engagement with the face of the roller as the belt passes thereover.

9. In a belt conveyer the combination of a belt having body composed of material suitable to provide tensile strength to the belt, one or more strips of rubbery material secured to the conveying surface of the belt and spaced so as to expose the strips of the belt body at their borders, and a guide roller adjacent the conveying surface of the belt, said roller embodying circumferential ribs separated by recesses and suitably spaced to engage the exposed body portion of the belt so that the rubbery surfaces ride between the ribs and clear of the surface of the recesses in the roller.

10. The combination of a belt for drag conveyers having a surface embodying a longitudinally extending area having relatively high frictional characteristics and an adjacent area having relatively low frictional characteristics and a support arranged to engage the belt along said latter area.

11. In a drag conveyer for sheet material, the combination of a support, a belt for conveying material along said support, a portion of said belt embodying a longitudinally extending material engaging surface having a relatively high frictional characteristic, and means cooperating with said support for engaging said belt along the low frictional surface and supporting the belt in such a manner that the high frictional surface travels free from engagement with the support.

PAUL J. BIRKMEYER.